Jan. 10, 1956 W. H. KITTO 2,730,219
CENTRIFUGAL CLUTCH
Filed Nov. 27, 1950 2 Sheets-Sheet 1
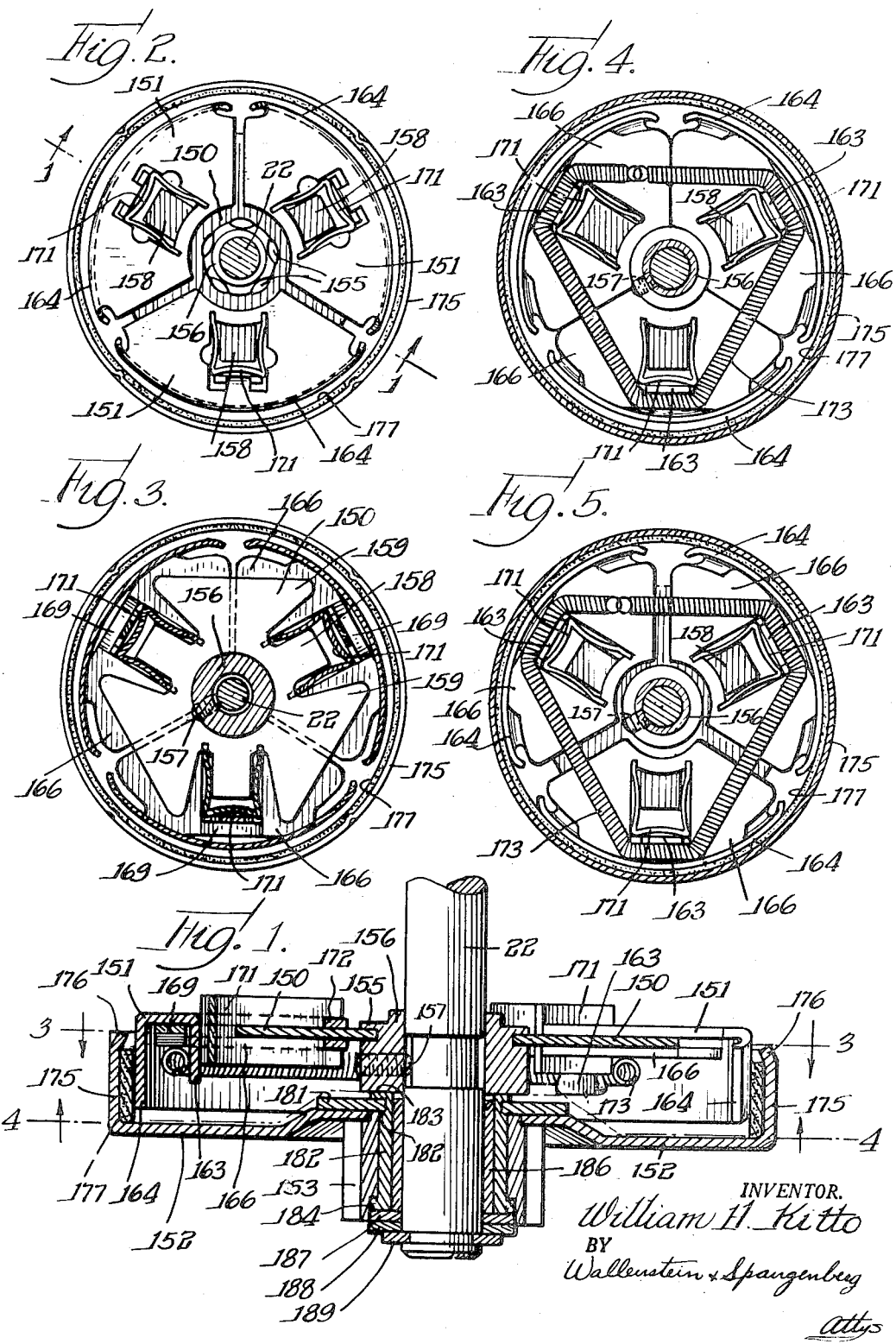
INVENTOR.
William H. Kitto
BY
Wallenstein & Spangenberg
Attys Jan. 10, 1956 W. H. KITTO 2,730,219
CENTRIFUGAL CLUTCH
Filed Nov. 27, 1950 2 Sheets-Sheet 2
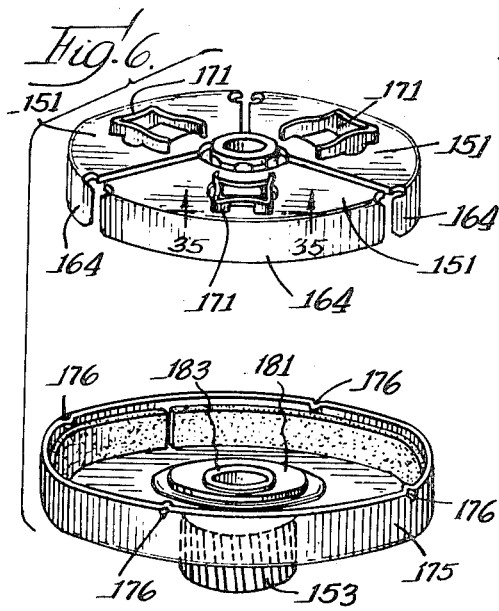
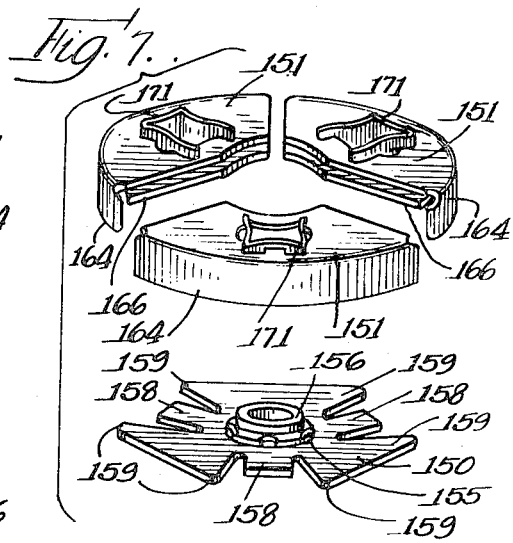
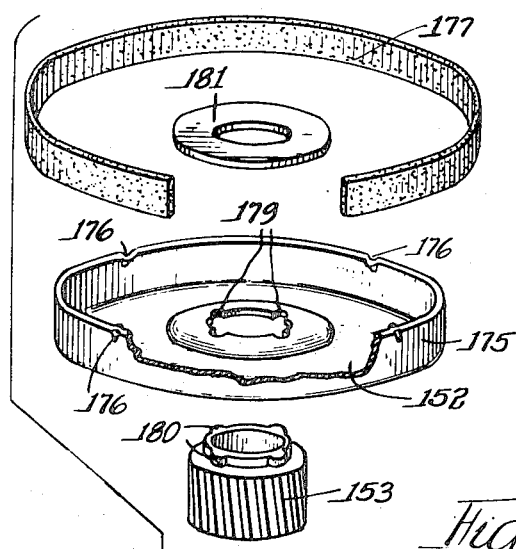
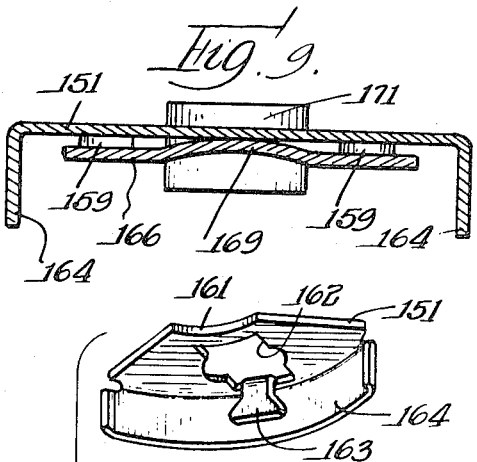
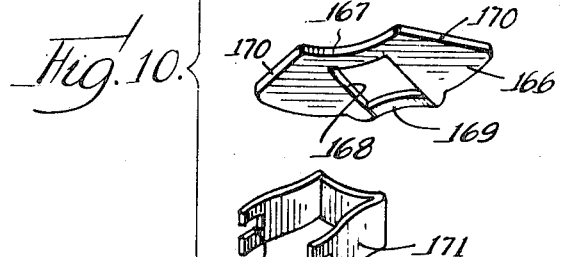
INVENTOR.
William H. Kitto
BY
Wallenstein + Spangenburg
Attys.

United States Patent Office 2,730,219
Patented Jan. 10, 1956

2,730,219

CENTRIFUGAL CLUTCH

William H. Kitto, Evanston, Ill., assignor to G-M Laboratories, Inc., Chicago, Ill., a corporation of Illinois Application November 27, 1950, Serial No. 197,722

17 Claims. (Cl. 192—105)

This invention relates to a centrifugal clutch of general utility and also to one which has particular utility in an improved floor polishing and scrubbing machine of the type having a motor driven single rotary flat brush.

The principal object of this invention is to provide an improved centrifugal clutch, which accurately operates at a predetermined speed, which provides a resilient drive, which is noiseless in operation, which may be made essentially of stamped metal parts, which may be rapidly and inexpensively manufactured and assembled, which requires no lubrication, which is particularly adaptable for transmitting torque from a motor to a brush in a floor polishing and scrubbing machine, and which also is of general utility.

A floor polishing and scrubbing machine utilizing the novel centrifugal clutch of this invention is fully illustrated and described in a co-pending application Serial No. 197,725 filed November 27, 1950, by Archie J. McMaster, William H. Kitto, and Kurt Burian, includes a base member which is preferably of an inverted cup shaped configuration. A substantially constant speed single phase induction motor is mounted on the upper side of the base member with the motor shaft extending downwardly through the base member. A phasing reactor is also mounted on the upper side of the base member. A cover is secured to the upper side of the base member and encloses the motor and phasing reactor. The lower end of the motor shaft operates a motor pinion meshing with a cluster gear carried by a bracket secured to the lower side of the base member. The cluster gear also meshes with an output gear carried by a bracket also secured to the lower side of the base member. Mounting means detachably secure a flat rotary brush to the output gear to be driven thereby. The novel centrifugal clutch of this invention is located between the motor shaft and the motor pinion. A handle having a bail is pivotally mounted on the side of the frame in transverse alignment with the brush axis for manipulating and controlling the machine.

When the motor is started, it starts under no load and rapidly accelerates to a speed at which the motor torque reaches its maximum value. At this point the centrifugal clutch connects the motor through the gearing to the brush for rotating the same at the desired speed. The machine may be readily and easily manipulated and controlled for performing the floor polishing and scrubbing operations. In case the brush should be jammed and fail to rotate on starting or in case the brush should be stalled during use, the centrifugal clutch will permit the motor to operate at substantial speed thereby avoiding overheating and burning out of the motor under these conditions.

The centrifugal clutch of this invention is carried by the lower end of the motor shaft and includes a drive plate adjustably carried by the motor shaft which in turn carries a plurality of weights urged inwardly by a garter spring. Spring devices between the clutch plate and the weights provide for a resilient drive and eliminate noise. A clutch cup including a suitable lining is engaged by the weight when the motor speed reaches the desired value and is driven thereby. The clutch cup is journaled for relative rotation on the motor shaft and carries a motor pinion, the motor pinion being coupled to the motor shaft by the centrifugal clutch when the motor is up to speed and uncoupled therefrom when the motor is not up to speed.

Further objects of this invention reside in the details of construction of the centrifugal clutch and in the cooperative relationship between the component parts thereof.

Other objects and advantages of this invention will become apparent to those skilled in the art upon reference to the accompanying specification, claims and drawings, in which:

Fig. 1 is an enlarged sectional view through the centrifugal clutch taken along line 1—1 of Fig. 2;

Fig. 2 is a top plan view of the novel centrifugal clutch of this invention;

Fig. 3 is a horizontal sectional view taken through line 3—3 of Fig. 1;

Fig. 4 is a sectional view taken along the line 4—4 of Fig. 1 and showing the clutch disengaged;

Fig. 5 is a view similar to Fig. 4 but showing the clutch engaged;

Fig. 6 is an exploded perspective view of the centrifugal clutch;

Fig. 7 is an exploded perspective view of the clutch drive plate and weights driven thereby;

Fig. 8 is an exploded perspective view of the clutch cup assembly;

Fig. 9 is a sectional view taken along the line 9—9 of Fig. 6; and

Fig. 10 is an exploded perspective view of the weight utilized in the clutch.

Referring now more specifically to the drawings, wherein like parts are designated by the same numerals throughout the various figures, a centrifugal clutch embodying the principles of this invention is shown best in Figs. 1 and 2. The lower end of a suitable motor shaft 22 carries the centrifugal clutch and motor pinion assembly including a clutch drive plate 150, clutch weights 151, a clutch cup 152, and a motor pinion 153. The clutch drive plate 150 is staked at 155 to a hub 156 which in turn is adjustably secured to the motor shaft 22 by means of a set screw 157, the set screw engaging a reduced portion on the motor shaft. Thus, the clutch drive plate 150 is carried and driven by the motor shaft 22. The clutch drive plate includes three fingers 158 for the purpose of driving and guiding the clutch weights. The remaining portions 159 of the drive plate 150 support, guide and separate the main clutch weights 151 and auxiliary clutch weights 166.

There are three main clutch weights 151, each of which is substantially sector-shaped but provided with a clearance radius 161 at the inner end thereof. Each sector is provided with a central opening 162 from which is struck downwardly an ear 163. The ear 163 is flared at its end for providing a camming action. Each main weight is also provided at its outer edge with a downwardly extending shoe 164. There are also provided three auxiliary weights 166, each of which is also substantially sector-shaped, having a radius 167 on its inner end, the radius 167 cooperating with the periphery of the hub 156 to limit inward movement of the weights. The auxiliary weight 166 is also provided with a central opening 168 and the connecting web 169 is curved upwardly for the purpose of spacing the outer end of the lower auxiliary weight apart from the outer end of the upper main weight to a distance substantially equal to the thickness of the drive plate 150. This maintains the two weights 151 and 166 in parallel relation. The upper weights 151 are placed on top of the drive plate 150 and the lower weights are placed underneath the drive plate, the openings 162 and 168 of the two weights being in alignment with the fingers 158 of the drive plate. U-shaped springs 171 having slots 172 on the ends thereof are inserted in the openings 162 and 168 of the main and auxiliary weights and over the fingers 158 of the drive plate 150. The slots 172 receive the inner ends of the main and auxiliary weights 151 and 166 and operate to maintain the inner ends of these weights in engagement with the drive plate 150. The ears 163 of the upper main weights 151 extend downwardly beyond the ends of the fingers 158 and through the openings 168 in the lower auxiliary weights. A garter spring 173 is hooked over these ears 163. The garter spring, therefore, urges the main and auxiliary weights 151 and 166 inwardly and because of the flared ends on the ears 163 also operates to maintain the curved rib 169 of the auxiliary weight 166 in engagement with the upper main weight 151. Thus, parallel relationship is maintained between the main and auxiliary weights and they are both urged inwardly by the action of the garter spring.

The outer edges of the auxiliary weights 166 engage the inner surfaces of the shoes 164 of the main weights so that both sets of weights are moved inwardly by the garter spring 173 and therefore operate together. The inward movement of the weights is limited by the radius 167 of the auxiliary weights 166 engaging the periphery of the hub 156 of the drive plate. When the weights are so moved inwardly the adjacent edges 170 of the auxiliary weights are brought together for the purpose of circumferentially and radially aligning the auxiliary and main weights. This prevents the weights from becoming cocked and hence causes the shoes 164 to assume a substantially circular position. In assembling the clutch mechanism the main weights and auxiliary weights are brought and held together by the spring clips 171. The main and auxiliary weights are then sandwiched over the drive plate with the spring clips engaging the sides of the fingers 158 of the drive plate. The adjacent edges 170 and the radius 167 of the auxiliary weights 166 extend beyond the corresponding edges and radius of the main weights 151, so that the main and auxiliary weights may be readily separated for slipping them over the drive plate in the assembly of the clutch mechanism. The spring clips 171 provide a resilient driving connection in the rotational direction between the drive plate 150 and the main and auxiliary weights 151 and 166. These spring clips 171 also operate to prevent chattering of the weights with respect to the drive plate and thereby eliminate noise.

The clutch cup 152 is provided with a side wall 175 against the inner side of which is mounted a clutch lining 177. The clutch lining is held in place in the clutch cup by detents 176 formed on the upper edge of the clutch cup. Since the friction between the clutch lining 177 and the side wall 175 of the clutch cup is greater than the friction of the shoes of the weights, it is not necessary to permanently secure the clutch lining to the clutch cup. All that is necessary is to maintain the clutch lining in place and this is accomplished by the detents 176. The center opening of the clutch cup is provided with recesses 179 for receiving lugs 180 formed on the upper end of the motor pinion 153. Preferably, the motor pinion is made of suitable plastic material such as nylon and the lugs 180 and recesses 179 form a drive connection between the nylon motor pinion and the clutch cup. The plastic motor pinion 153 is pressed onto a metal sleeve 182 which is provided at its bottom with a shoulder 184 to limit downward movement of the motor pinion with respect to the sleeve. The upper portion of the metal sleeve 182 is provided with a shoulder 182' which receives a collar 181, the collar operating to clamp the clutch cup 152 in driving engagement on the motor pinion 153. When the parts are thus assembled, the upper end of the metal sleeve is peened over at 183 to hold the parts in assembled relation. The peened over portion is ground or otherwise formed flat since it serves as an end thrust member between the sleeve 182 and the clutch plate hub 156.

A sintered porous bronze bearing sleeve 186 is interposed between the metal sleeve 182 and the motor shaft 22. The bearing sleeve has a light interference fit with the motor shaft 22 and has a running fit with the metal sleeve 182. The porous bearing sleeve 186 is impregnated with a suitable lubricant for lubricating the running fit and the lubricating action is aided by centrifugal force on the lubricant afforded by the rotation of the bearing sleeve with the motor shaft.

A thrust bearing for the motor pinion 153 is provided at the lower end of the motor shaft 22. It consists of a washer 187 carried by the motor pinion and a second washer 188 carried by the motor shaft. The washer 188 is held in place by a split washer 189 carried in a suitable groove on the lower end of the motor shaft.

In assembling the clutch mechanism and motor pinion assembly, the motor pinion assembly is brought to its lowermost position with the thrust washers 187 and 188 in engagement. Then the hub 156 of the clutch drive plate 150 is secured to the motor shaft by the set screw 157 to provide the proper clearance between the hub 156 and the flat peened over portion 183 of the pinion sleeve 182. In this way proper end play is provided for the clutch and motor pinion assembly.

When the novel clutch of this invention is used in a machine of the type described in said co-pending application Serial No. 197,725, the centrifugal clutch couples the motor shaft to the motor pinion, and there is no relative motion therebetween during normal operation. Relative motion occurs between the motor shaft and the motor pinion only in starting the machine or upon stalling of the brush while the motor is running. Upon starting the machine, the motor starts under no load and rapidly accelerates to the desired normal operating speed. When the motor speed reaches about 2600 R. P. M. the clutch weights fly outwardly against the action of the garter spring firmly to engage the lining of the clutch cup and thus couple the motor shaft to the motor pinion. In the normal operation of the machine the motor runs at about 3300 R. P. M. If the brush should stall, the motor speed drops to about 2800 R. P. M. whereupon the clutch starts to slip and the motor continues to run at a speed of somewhat less than 2800 R. P. M. This prevents undue heating and burning out of the motor under these adverse conditions.

From the above description, it is seen that the present invention has provided a novel centrifugal clutch which may be rapidly and inexpensively manufactured using essentially sheet metal parts. In addition, it is seen that the novel construction and arrangement of the weight members of the clutch provides improved performance and noiseless operation and requires no lubrication.

While for the purposes of illustration one form of this invention has been disclosed, other forms thereof may become apparent to those skilled in the art upon reference to this disclosure and, therefore, this invention is to be limited only by the scope of the appended claims.

I claim as my invention:

1. A centrifugal clutch comprising, a rotatable drive shaft, a drive plate secured to the drive shaft for rotation therewith, a plurality of weights having shoes on their outer edges, means including spring means movable with and radially slidably mounting the weights on the drive plate for substantially straight line radial movement relative to the drive plate to and from extended and retracted positions and resiliently connecting the weights to the drive plate for resiliently driving the weights in a rotative direction by the drive plate, additional spring means urging the weights inwardly until overcome by centrifugal force whereupon said weights slide radially outwardly against the action of said last mentioned spring means, and a cup member rotatably mounted on the drive shaft for rotation relative thereto and engaged by the shoes of the weights when the weights slide radially outwardly to be rotated thereby.

2. In a centrifugal clutch having a rotatable sheet material drive plate, a plurality of sheet material weights having shoes on their outer edges, means for radially slidably mounting the weights on the drive plate and for driving the same in a rotative direction by the drive plate spring means urging the weights inwardly until overcome by centrifugal force whereupon said weights slide radially outwardly against the action of said spring means, the combination comprising a sheet material cup member having an annular side flange, a clutch lining engaging the side flange of the cup member, and detents on the edge of the annular side flange for retaining the clutch lining in the cup member.

3. A centrifugal clutch comprising, a rotatable drive shaft, a drive plate having a hub, means for longitudinally adjustably securing the drive plate hub to the drive shaft for rotation therewith, a plurality of weights having shoes on their outer edges, means including generally U-shaped spring means having legs disposed between generally radially extending opposed surfaces on said drive plate and weights for radially slidably mounting the weights on the drive plate and for driving the same in a rotative direction by the drive plate, additional spring means urging the weights inwardly until overcome by centrifugal force whereupon said weights slide radially outwardly against the action of said last named spring means, a cup member having a hub, and means for rotatably mounting the cup member hub on the drive shaft for engagement of the cup member by the shoes of the weights when the shoes slide radially outwardly for rotating the cup member.

4. A centrifugal clutch comprising, a rotatable drive plate having a plurality of radially extending fingers, a plurality of sector shaped weights having shoes on their outer edges and central openings therein overlying the drive plate fingers, said openings being defined by opposed generally radially extending edges, spring means received within the weight openings and engaging the radial edges of the drive plate fingers and said radially extending edges of the weight openings for radially slidably mounting the weights on the drive plate and resiliently connecting the weights to the drive plate for resiliently driving the weights in a rotative direction, additional spring means urging the weights inwardly until overcome by centrifugal force whereupon said weights slide radially outwardly against the action of said last mentioned spring means, and a cup member engaged by the shoes of the weights when the weights slide radially outwardly to be rotated thereby.

5. A centrifugal clutch comprising, a rotatable drive plate having a plurality of radially extending fingers, a plurality of main sector shaped weights on one side of the drive plate having shoes on their outer edges and openings overlying the drive plate fingers, a plurality of auxiliary sector shaped weights on the other side of the drive plate and having openings overlying the drive plate fingers and having their outer edges engaging the shoes of the main weights, spring means received in the openings of the main and auxiliary weights and engaging the radial edges of the drive plate fingers for radially slidably mounting the main and auxiliary weights on the drive plate and for resiliently connecting the main and auxiliary weights to the drive plate for resiliently driving said weights in a rotative direction, spring means urging the weights inwardly until overcome by centrifugal force whereupon said weights slide radially outwardly against the action of said last mentioned spring means, and a cup member engaged by the shoes of the weights when the weights slide radially outwardly to be rotated thereby.

6. A centrifugal clutch comprising, a rotatable drive plate having a plurality of radially extending fingers, a plurality of main sector shaped weights on one side of the drive plate having shoes on their outer edges and openings overlying the drive plate fingers, a plurality of auxiliary sector shaped weights on the other side of the drive plate and having openings overlying the drive plate fingers and having their outer edges engaging the shoes of the main weights, spring means received in the openings of the main and auxiliary weights and engaging the radial edges of the drive plate fingers for radially slidably mounting the main and auxiliary weights on the drive plate and for resiliently connecting the main and auxiliary weights to the drive plate for resiliently driving said weights in a rotative direction, ears on the main weights extending through the openings in the auxiliary weights beyond the ends of the drive plate fingers, a garter spring encompassing the ears for urging the main weights and hence the auxiliary weights inwardly until overcome by centrifugal force whereupon said weights slide radially outwardly against the action of said garter spring, and a cup member engaged by the shoes of the weights when the weights slide radially outwardly to be rotated thereby.

7. A centrifugal clutch comprising, a rotatable drive plate having a plurality of radially extending fingers, a plurality of main sectors shaped weights on one side of the drive plate having shoes on their outer edges and openings overlying the drive plate fingers, a plurality of auxiliary sector shaped weights on the other side of the drive plate and having openings overlying the drive plate fingers and having their outer edges engaging the shoes of the main weights, spring means received in the openings of the main and auxiliary weights and engaging the radial edges of the drive plate fingers for radially slidably mounting the main and auxiliary weights on the drive plate and for resiliently connecting the main and auxiliary weights to the drive plate for resiliently driving said weights in a rotative direction, spacer means between the main and auxiliary weights beyond the ends of the drive plate fingers, spring means urging the weights inwardly until overcome by centrifugal force whereupon said weights slide radially outwardly against the action of said last mentioned spring means, and a cup member engaged by the shoes of the weights when the weights slide radially outwardly to be rotated thereby.

8. A centrifugal clutch comprising, a rotatable drive plate having a plurality of radially extending fingers, a plurality of main sector shaped weights on one side of the drive plate having shoes on their outer edges and openings overlying the drive plate fingers, a plurality of auxiliary sector shaped weights on the other side of the drive plate and having openings overlying the drive plate fingers and having their outer edges engaging the shoes of the main weights, spring means received in the openings of the main and auxiliary weights and engaging the radial edges of the drive plate fingers for radially slidably mounting the main and auxiliary weights on the drive plate and for resiliently connecting the main and auxiliary weights to the drive plate for resiliently driving said weights in a rotative direction, ears on the main weights extending through the openings in the auxiliary weights beyond the ends of the drive plate fingers, a garter spring encompassing the ears for urging the main weights and hence the auxiliary weights inwardly until overcome by centrifugal force whereupon said weights slide radially outwardly against the action of said garter spring, spacer means between the main and auxiliary weights beyond the ends of the drive plate fingers, and a cup member engaged by the shoes of the weights when the weights slide radially outwardly to be rotated thereby.

9. A centrifugal clutch comprising, a rotatable drive plate having a hub and a plurality of radially extending fingers, a plurality of main sector shaped weights on one side of the drive plate having shoes on their outer edges and openings overlying the drive plate fingers, a plurality of auxiliary sector shaped weights on the other side of the drive plate and having openings overlying the drive plate fingers and having their outer edges engaging the shoes of the main weights, spring means received in the openings of the main and auxiliary weights and engaging the radial edges of the drive plate fingers for radially slidably mounting the main and auxiliary weights on the drive plate and for resiliently connecting the main and auxiliary weights to the drive plate for resiliently driving said weights in a rotative direction, spring means urging the main weights and hence the auxiliary weights inwardly, the auxiliary weights engaging the drive plate hub to limit the inward movement of the weights, centrifugal force overcoming the last mentioned spring means to cause the weights to slide radially outwardly adjacent the action of the last mentioned spring means, and a cup member engaged by the shoes of the weights when the weights slide radially outwardly to be rotated thereby.

10. A centrifugal clutch comprising, a rotatable drive plate having a plurality of radially extending fingers, a plurality of main sector shaped weights on one side of the drive plate having shoes on their outer edges and openings overlying the drive plate fingers, a plurality of auxiliary sector shaped weights on the other side of the drive plate and having openings overlying the drive plate fingers and having their outer edges engaging the shoes of the main weights, spring means received in the openings of the main and auxiliary weights and engaging the radial edges of the drive plate fingers for radially slidably mounting the main and auxiliary weights on the drive plate and for resiliently connecting the main and auxiliary weights to the drive plate for resiliently driving said weights in a rotative direction, spring means urging the main weights and hence the auxiliary weights inwardly, the radial edges of the auxiliary weights extending beyond the radial edges of the main weights to facilitate assembly of the weights on the drive plate and to engage each other for radially aligning the weights when they are retracted inwardly by the last mentioned spring means, centrifugal force overcoming the last mentioned spring means to cause the weights to slide radially outwardly against the action of the last mentioned spring means, and a cup member engaged by the shoes of the weights when the weights slide radially outwardly to be rotated thereby.

11. A centrifugal clutch comprising, a rotatable drive plate having a hub and a plurality of radially extending fingers, a plurality of main sector shaped weights on one side of the drive plate having shoes on their outer edges and openings overlying the drive plate fingers, a plurality of auxiliary sector shaped weights on the other side of the drive plate and having openings overlying the drive plate fingers and having their outer edges engaging the shoes of the main weights, spring means received in the openings of the main and auxiliary weights and engaging the radial edges of the drive plate fingers for radially slidably mounting the main and auxiliary weights on the drive plate and for resiliently connecting the main and auxiliary weights to the drive plate for resiliently driving said weights in a rotative direction, spring means urging the main weights and hence the auxiliary weights inwardly, the auxiliary weights engaging the drive plate hub to limit the inward movement of the weights, the radial edges of the auxiliary weights extending beyond the radial edges of the main weights to facilitate assembly of the main weights to facilitate assembly of the weights on the drive plate and to engage each other for radially aligning the weights when they are retracted inwardly by the last mentioned spring means, centrifugal force overcoming the last mentioned spring means to cause the weights to slide radially outwardly against the action of the last mentioned spring means, and a cup member engaged by the shoes of the weights when the weights slide radially outwardly to be rotated thereby.

12. A centrifugal clutch comprising, a rotatable drive plate having a plurality of radially extending fingers, a plurality of main sector shaped weights on one side of the drive plate having shoes on their outer edges and openings overlying the drive plate fingers, a plurality of auxiliary sector shaped weights on the other side of the drive plate and having openings overlying the drive plate fingers and having their outer edges engaging the shoes of the main weights, spring means received in the openings of the main and auxiliary weights and engaging the radial edges of the drive plate fingers for radially slidably mounting the main and auxiliary weights on the drive plate and for resiliently connecting the main and auxiliary weights to the drive plate for resiliently driving said weights in a rotative direction, ears on the main weights extending through the openings in the auxiliary weights beyond the ends of the drive plate fingers, a garter spring encompassing the ears for maintaining the main and auxiliary weights in contact with the drive plate and for urging the main weights and hence the auxiliary weights inwardly until overcome by centrifugal force whereupon said weights slide radially outwardly against the action of said garter spring, and a cup member engaged by the shoes of the weights when the weights slide radially outwardly to be rotated thereby.

13. A centrifugal clutch comprising, a rotatable drive plate having a plurality of radially extending fingers, a plurality of main sector shaped weights on one side of the drive plate having shoes on their outer edges and openings overlying the drive plate fingers, a plurality of auxiliary sector shaped weights on the other side of the drive plate and having openings overlying the drive plate fingers and having their outer edges engaging the shoes of the main weights, spring means received in the openings of the main and auxiliary weights and engaging the radial edges of the drive plate fingers for radially slidably mounting the main and auxiliary weights on the drive plate and for resiliently connecting the main and auxiliary weights to the drive plate for resiliently driving said weights in a rotative direction, ears on the main weights extending through the openings in the auxiliary weights beyond the ends of the drive plate fingers, a garter spring encompassing the ears for maintaining the main and auxiliary weights in contact with the drive plate and for urging the main weights and hence the auxiliary weights inwardly until overcome by centrifugal force whereupon said weights slide radially outwardly against the action of said garter spring, spacer means between the main and auxiliary weights beyond the ends of the drive plate fingers, and a cup member engaged by the shoes of the weights when the weights slide radially outwardly to be rotated thereby.

14. A centrifugal clutch, comprising a rotatable drive plate, a plurality of weights, means generally radially slidably mounting said weights on one side of said drive plate, each of said weights having ears extending beyond the opposite side of said drive plate, a garter spring encompassing the ears for urging the weights radially inwardly until overcome by centrifugal force, whereupon the weights slide outwardly against the action of the garter spring, and cam means at the free ends of said ears cooperable with said garter spring for retaining said weights on said drive plate.

15. A centrifugal clutch, comprising a rotatable drive plate, a first group of weights radially slidably mounted on one side of said drive plate, a second group of weights radially slidably mounted on the opposite side of said drive plate, each of the weights in said first mentioned group having an ear extending beyond the opposite side of said drive plate and the weights of the other of said groups, a garter spring encompassing said ears for urging said weights inwardly until overcome by centrifugal force, whereupon the weights slide outwardly, and cam means at the free ends of said ears cooperable with said garter spring for retaining both groups of said weights on said drive plate.

16. A centrifugal clutch, as defined in claim 15, which includes means for spacing said other group of weights from said drive plate so as to facilitate relative sliding movement between said drive plate and said other group of weights.

17. A centrifugal clutch, comprising a rotatable drive plate having a plurality of generally radially extending arms, a plurality of weights slidably disposed on said drive plate, each of said weights having an opening overlying one of the arms of said drive plate, an elongated sheet material flexure spring disposed between a generally radially extending edge of each of said arms and a generally radially extending edge of each of said weights defining the opening therein, whereby to provide a yieldable driving connection between said drive plate and said weights, each of said springs having a slot in one end thereof receiving marginal portions of its associated weight and said drive plate, whereby the springs retain the weights against axial separation from the drive plate.

References Cited in the file of this patent

UNITED STATES PATENTS

| | | |
|---|---|---|
| 1,703,694 | Rushton | Feb. 26, 1929 |
| 1,715,807 | Wersall | June 4, 1929 |
| 1,841,612 | Leyner | Jan. 19, 1932 |
| 2,000,713 | Norris | May 7, 1935 |
| 2,036,500 | Raven et al. | Apr. 7, 1936 |
| 2,036,586 | Porin | Apr. 7, 1936 |
| 2,504,177 | Bruestle | Apr. 18, 1950 |

FOREIGN PATENTS

| | | |
|---|---|---|
| 199,796 | Great Britain | June 28, 1923 |
| 237,836 | Switzerland | Sept. 1, 1945 |
| 546,782 | Germany | Mar. 17, 1932 |
| 598,056 | France | Dec. 5, 1925 |
| 829,254 | France | Mar. 21, 1938 |